US008485509B2

(12) United States Patent
Wang

(10) Patent No.: US 8,485,509 B2
(45) Date of Patent: Jul. 16, 2013

(54) FIXING MECHANISM AND MANIPULATOR USING THE SAME

(75) Inventor: Hui Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 723 days.

(21) Appl. No.: 12/607,226

(22) Filed: Oct. 28, 2009

(65) Prior Publication Data

US 2011/0024594 A1  Feb. 3, 2011

(30) Foreign Application Priority Data

Aug. 3, 2009 (CN) .......................... 2009 1 0305119

(51) Int. Cl.
*B23Q 3/02* (2006.01)
*B23Q 3/00* (2006.01)
*B25B 3/00* (2006.01)

(52) U.S. Cl.
USPC .............................. 269/249; 269/271; 269/95

(58) Field of Classification Search
USPC .............. 269/43, 45, 246, 271, 95, 143, 249, 269/266, 254 CS
See application file for complete search history.

(56) References Cited

U.S. PATENT DOCUMENTS

| 3,638,560 | A  | * | 2/1972 | Morgan et al. ................ 100/300 |
| 5,009,134 | A  | * | 4/1991 | Sorensen et al. ................ 81/487 |
| 5,149,071 | A  | * | 9/1992 | Oliveira ......................... 269/43 |
| 5,170,682 | A  | * | 12/1992 | Sorensen et al. ................ 81/487 |
| 6,342,138 | B1 | * | 1/2002 | Brown ..................... 204/297.09 |
| 6,386,532 | B1 | * | 5/2002 | Donovan et al. ................ 269/25 |
| 6,412,767 | B1 | * | 7/2002 | Beckmann et al. .......... 269/166 |
| 6,499,158 | B1 | * | 12/2002 | Easterling ........................ 5/600 |
| 6,705,217 | B1 | * | 3/2004 | Godsey et al. .................. 101/35 |
| 7,003,827 | B2 | * | 2/2006 | DeMayo .......................... 5/600 |
| 7,004,067 | B1 | * | 2/2006 | Godsey et al. .................. 101/35 |
| 8,020,840 | B2 | * | 9/2011 | Hall et al. ........................ 269/6 |
| 8,083,198 | B2 | * | 12/2011 | Stabler ....................... 248/316.6 |
| 8,091,874 | B2 | * | 1/2012 | Ray Avalani ..................... 269/6 |
| 8,282,088 | B2 | * | 10/2012 | Janson et al. ..................... 269/6 |
| 2003/0155478 | A1 | * | 8/2003 | Easterling .................. 248/316.1 |
| 2009/0026679 | A1 | * | 1/2009 | Harman, III .................... 269/43 |
| 2009/0236787 | A1 | * | 9/2009 | Sandmeier ...................... 269/95 |
| 2010/0219573 | A1 | * | 9/2010 | O'Rell et al. .................. 269/246 |

FOREIGN PATENT DOCUMENTS

| CN | 201020605 Y | 2/2008 |
| CN | 101428382 A | 5/2009 |

* cited by examiner

*Primary Examiner* — Joshua J Michener
*Assistant Examiner* — Elizabeth A Plummer
(74) *Attorney, Agent, or Firm* — Altis Law Group, Inc.

(57) ABSTRACT

A fixing mechanism includes a fixed member, a movable member, and a driving member. The fixed member has a first claw portion, and the movable member has a second claw portion. The movable member is movably connected to the fixed member via the driving member. The driving member is configured for moving the movable member in a direction away from the first claw portion of the fixed member. A manipulator using the fixing mechanism is also disclosed.

5 Claims, 3 Drawing Sheets

FIXING MECHANISM AND MANIPULATOR USING THE SAME

BACKGROUND

1. Technical Field

The present disclosure relates generally to manufacturing, and more specifically, to a fixing mechanism for a manipulator.

2. Description of Related Art

Conventionally, to enhance mechanical strength and appearance of an electronic device, a metallic cover is provided with, often, a polished finish.

Generally, before polishing a workpiece such as a cover, the workpiece needs to be positioned securely. Typically, if the outer surface of the workpiece includes a curved portion and a planar portion, the workpiece is mainly positioned manually, which is very time-consuming. In addition, due to the curved and planar profiles of the workpiece, the outer surface of the workpiece cannot be completely polished in one process, requiring at least one repositioning, thereby consuming more time.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
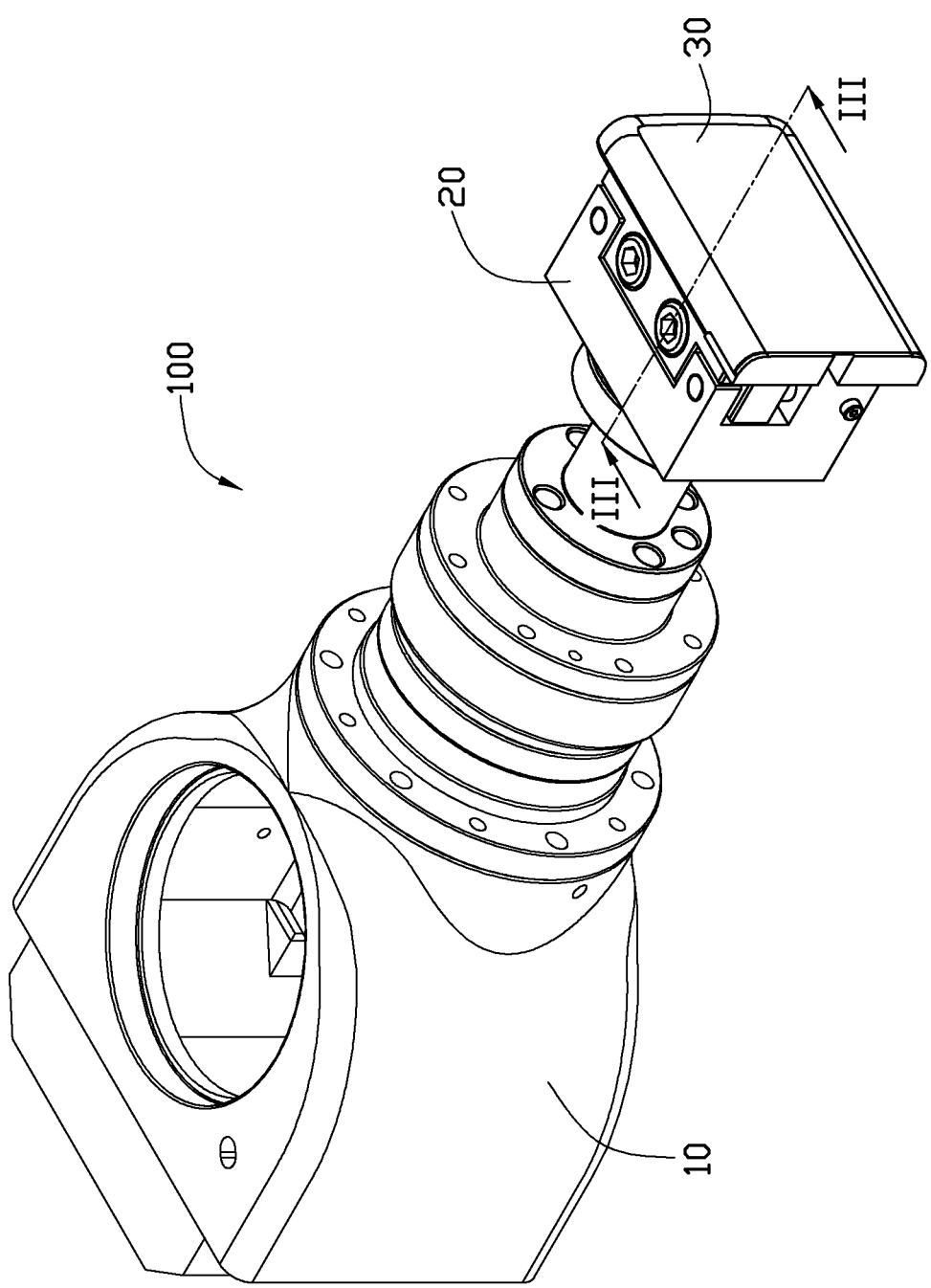
FIG. 1 is an isometric view of an embodiment of a manipulator as disclosed, used to secure a workpiece, the manipulator including a fixing mechanism.

Referring to FIG. 1, an exemplary manipulator 100 is shown. The manipulator 100 includes a support arm 10 and a fixing mechanism 20. The fixing mechanism 20 is mounted on the support arm 10 to position a workpiece 30. The support arm 10 can move the fixing mechanism 20 and the workpiece 30. The manipulator 100 can be used with for example a polishing machine (not shown) to polish an outer surface of the workpiece 30.

Figure 2:
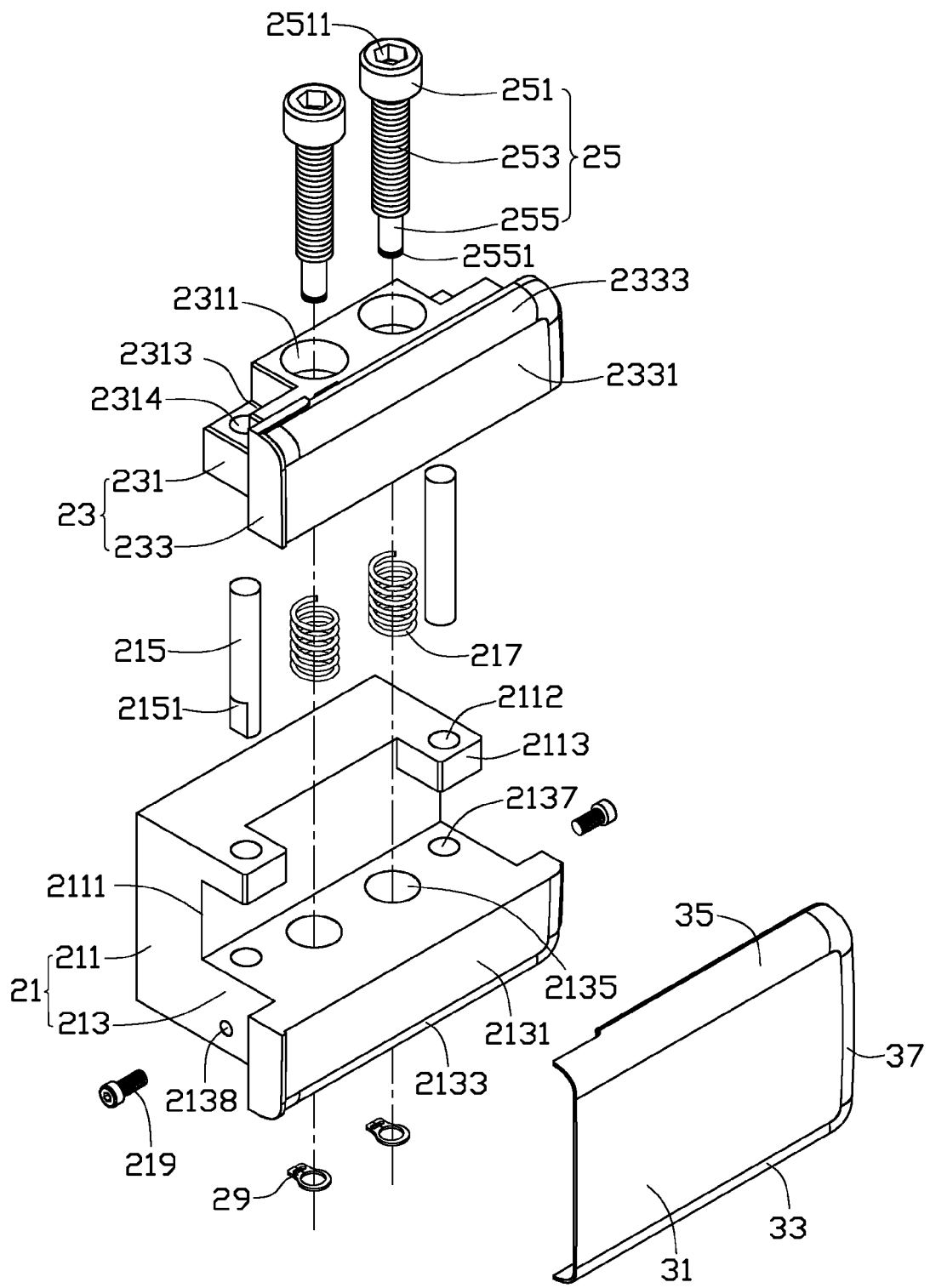
FIG. 2 is an exploded view of an embodiment of a fixing mechanism as disclosed, employed by a manipulator, such as, for example, that of FIG. 1.

Referring to FIG. 2, the workpiece 30 includes a bottom board 31, a first sidewall 33, a second sidewall 35, and a third sidewall 37. The first sidewall 33, the second sidewall 35, and the third sidewall 37 extend from a periphery of the bottom board 31. The third sidewall 37 interconnects the first sidewall 33 and the second sidewall 35. The first side wall 33 faces the second sidewall 35. In the illustrated embodiment, all of the sidewalls 33, 35, 37 are curved.

The fixing mechanism 20 includes a fixed member 21, a movable member 23, and two driving members 25. The movable member 23 is movably connected to the fixed member 21 via the driving members 25.

The fixed member 21 includes a rectangular first baseboard 211 and a first claw block 213 extending substantially perpendicular from a side 2111 of the first baseboard 211. The first baseboard 211 can be mounted on the support arm 10 by fasteners, such as screws (not shown). The first claw block 213 includes a first positioning surface 2131 and a first claw portion 2133. The first positioning surface 2131 is defined on an end of the first claw block 213 away from the first baseboard 211. The first positioning surface 2131 conforms in shape to the bottom board 31 of the workpiece 30. The first claw portion 2133 is adjacent to the first positioning surface 2131. In use, the first claw portion 2133 can abut an inner surface of the first sidewall 33 of the workpiece 30. The first claw block 213 defines two positioning holes 2135 to receive the driving members 25 and two first through holes 2137 adjacent to the two positioning holes 2135. The fixed member 21 further includes two projections 2113 extending substantially perpendicular from the side 2111 of the first baseboard 211 above the first claw block 213. Each projection 2113 defines a second through hole 2112 aligned with the two first through holes 2137.

Figure 3:
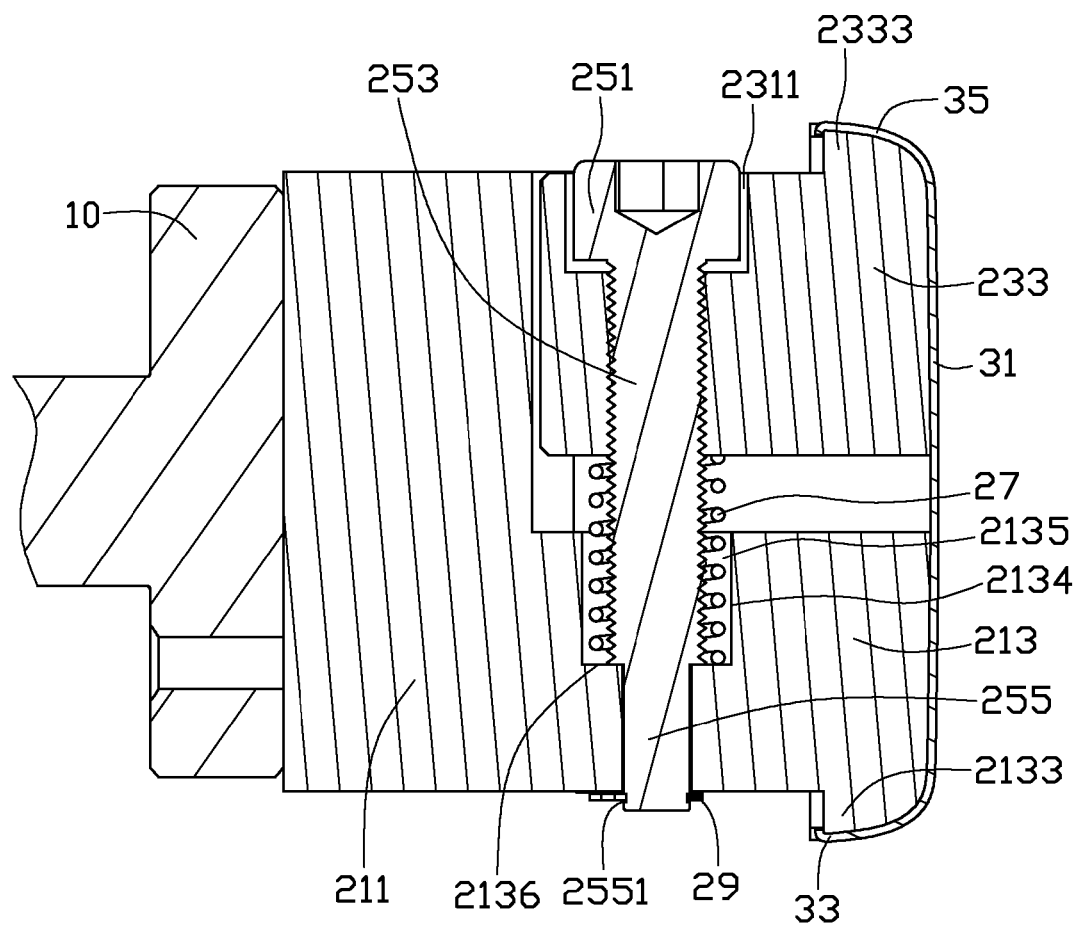
FIG. 3 is a sectional view of the fixing mechanism of FIG. 1 taken along line III-III.

Referring to FIG. 3, the positioning hole 2135 defines an inner sidewall 2134. The inner sidewall 2134 defines a stepped portion 2136.

The fixing mechanism 20 further includes two guide posts 215 to guide the movable member 23. Each of the guide posts 215 is substantially cylindrical and has two distal ends correspondingly received in the first through hole 2137 and the second through hole 2112. The guide post 215 further defines a flat surface 2151 near one end of the guide post 215. The first claw block 213 further defines a pinhole 2138 communicating with the first through hole 2137. The fixing mechanism 20 further includes two securing bolts 219. The securing bolts 219 pass through the pinhole 2138 and abut the flat surface 2151 of the guide post 215, so as to prevent the guide post 215 from detaching from the first through hole 2137.

The movable member 23 includes a rectangular second baseboard 231 and a second claw block 233 extending substantially perpendicular from a side of the second baseboard 231. The second baseboard 231 defines two threaded through holes 2311 to correspondingly receive the two driving members 25. The second baseboard 231 further defines two stepped portions 2313 on two opposite sides of the second baseboard 231. Each stepped portion 2313 defines a guide hole 2314 to receive the guide post 215. The second claw block 233 defines a second positioning surface 2331 on an end of the second claw block 233 away from the second baseboard 231 and a second claw portion 2333 adjacent to the second positioning surface 2331. The second positioning surface 2331 conforms in shape to the bottom board 31 of the workpiece 30. In use, the second claw portion 2333 can abut an inner surface of the second sidewall 35.

The driving member 25 is substantially cylindrical and includes a head portion 251, a threaded portion 253, and a positioning portion 255. The threaded portion 253 interconnects to the head portion 251 and the threaded portion 253. The head portion 251 defines a hexagonal groove 2511 to be latched by a hexagon wrench (not shown). The threaded portion 253 can theadedly engage the threaded hole 2311 so as to move the movable member 23 relative to the fixed member 21.

Referring to FIG. 3, the fixing mechanism 20 further includes two elastic members 217 sleeved on each threaded portion 253 of the two driving members 25. One end of the elastic member 217 abuts the second baseboard 231, and the other end of the elastic member 217 abuts the stepped portion 2136 of the fixed member 21. In the illustrated embodiment, the elastic member 217 is a spring. The positioning portion 255 has a diameter smaller than that of the threaded portion 253, such that the positioning portion 255 can be rotatably received in the positioning hole 2135 of the fixed member 21. The fixing mechanism 20 further includes two clip springs 29, each abutting a side of the first claw block 213. The positioning portion 255 defines an annular latching groove 2551 near one end of the positioning portion 255 to receive the corresponding clip spring 29.

During assembly of the fixing mechanism 20, two elastic members 217 are placed on each of the stepped portions 2136 of the two positioning hole 2135. The movable member 23 is placed on the first claw block 213 of the fixed member 21, and the guide hole 2314 of the movable member 23 is aligned with the second through hole 2112 of the fixed member 21. The guide post 215 passes through the second through hole 2112, the guide hole 2314, and is received in the first through hole 2137. The securing bolt 219 passes through the pinhole 2138 and abuts the flat surface 2151 of the guide post 215, such that the guide post 215 is fixed to the fixed member 21, and the movable member 23 can only move along an axis of the guide post 215 relative to the fixed member 21. The driving member 25 passes through the threaded hole 2311, the elastic member 217, and is received in the positioning hole 2135. The end of the threaded portion 253 abuts the stepped portion 2136 of the positioning hole 2135 and is restricted from further downward movement because the diameter of the threaded portion 253 of the driving member 25 is greater than that of the positioning portion 255. When the latching groove 2551 is located outside the positioning hole 2135, the clip spring 29 is received in the latching groove 2551, such that the positioning portion 255 is not able to move upwardly to detach from the positioning hole 2135. The positioning portion 255 can only rotate in the positioning hole 2135 and is restricted from movement along an axis of the positioning hole 2135. The assembly of the fixing mechanism 20 is completed.

During assembly of the manipulator 100, the fixing mechanism 20 is fixed on the support arm 10 via the fasteners.

In use, the workpiece 30 can be mounted to the fixing mechanism 20. The first positioning surface 2131 of the fixed member 21 and the second positioning surface 2331 of the movable member 23 abut the bottom board 31 of the workpiece 30. The first claw portion 2133 abuts the first sidewall 33. The driving member 25 rotates, and the threaded portion 253 rotates in the threaded hole 2311, such that the movable member 23 moves upwardly along an axis of driving member 25 in a direction away from the first claw portion 2133 of the fixed member 21. The second claw portion 2333 is detached from the first claw portion 2133 and abuts the second sidewall 35, such that the workpiece 30 is secured in the fixing mechanism 20. The manipulator 100 drives the workpiece 30 to cooperate with the polishing machine to polish the surfaces of the workpiece 30. When polishing is complete, the driving member 25 reverse, rotates and the movable member 23 moves towards the fixed member 21, such that workpiece 30 can be easily removed from the fixing mechanism 20.

The fixing mechanism 20 has a simple structure and provides precise positioning, and can be used with workpieces of varying materials. Furthermore, the first claw portion 2133 and the second claw portion 2333 interact with the workpiece 30 only on an inner surface, such that the entire outer surface of the workpiece 30 can easily be processed in a single step, increasing the speed of the process and reducing processing time.

It should be pointed out that the guide post 215, the elastic member 217, and the securing bolt 219 may be omitted. If the positioning portion 255 of the driving member 25 is retained in the positioning hole 2135 via other mechanisms, the clip spring 29 may be omitted.

The threaded hole 2311 may be defined on the fixed member 21, such that the driving member 25 and the movable member 23 move together relative to the fixed member 21.

The movable member 23 may be driven by other driving members such as cylinder, servomotor, gearing, worm gearing, or other means.

In addition to polishing, the manipulator 100 may also be used in processes such as spray painting, welding, and others.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A fixing mechanism for positioning a workpiece comprising a bottom board, a first sidewall and a second sidewall, the first sidewall and the second sidewall each extending from a periphery of the bottom board and facing each other, the fixing mechanism comprising:

a fixed member comprising a first baseboard and a first claw block extending perpendicularly from the first baseboard, the first claw block comprising a first positioning surface and a first claw portion, the first positioning surface being on an end of the first claw block away from the first baseboard and configured for abutting the bottom board of the workpiece, and the first claw portion being adjacent to the first positioning surface and configured for abutting an inner surface of the first sidewall of the workpiece;

a movable member comprising a second baseboard and a second claw block extending perpendicularly from the second baseboard, the second claw block comprising a second positioning surface and a second claw portion, the second positioning surface being on an end of the second claw block away from the second baseboard and configured for abutting the bottom board of the workpiece, and the second claw portion being adjacent to the second positioning surface and configured for abutting an inner surface of the second sidewall of the workpiece; and a driving member;

wherein the movable member is movably connected to the fixed member via the driving member; and the driving member is configured for moving the movable member in a direction away from the first claw portion of the fixed member;

wherein the driving member comprises a threaded portion and a positioning portion adjacent to the threaded portion, the positioning portion of the driving member has no screw thread and has a diameter less than a diameter of the threaded portion, the fixed member defines a positioning hole to receive the positioning portion, and the positioning portion is rotatably received in the positioning hole;

wherein the movable member defines a threaded hole, and the threaded portion engages in the threaded hole; and wherein the positioning hole comprises an inner sidewall, the inner sidewall defines a stepped portion thereon, the threaded portion of the driving member comprises a first end and a second end opposite to the first end, and the first end abuts the stepped portion.

2. The fixing mechanism of claim 1, wherein the driving member further comprises a head at the second end and a latching groove at a distal end of the positioning portion far away from the threaded portion, and the latching groove is exposed from a bottom of the positioning hole, and is latched by a clip spring.

3. A fixing mechanism for positioning a workpiece comprising a bottom board, a first sidewall and a second sidewall, the first sidewall and the second sidewall each extending from a periphery of the bottom board and facing each other, the fixing mechanism comprising:
- a fixed member comprising a first baseboard and a first claw block extending perpendicularly from the first baseboard, the first claw block comprising a first positioning surface and a first claw portion, the first positioning surface being on an end of the first claw block away from the first baseboard and configured for abutting the bottom board of the workpiece, and the first claw portion being adjacent to the first positioning surface and configured for abutting an inner surface of the first sidewall of the workpiece;
- a movable member comprising a second baseboard and a second claw block extending perpendicularly from the second baseboard, the second claw block comprising a second positioning surface and a second claw portion, the second positioning surface being on an end of the second claw block away from the second baseboard and configured for abutting the bottom board of the workpiece, and the second claw portion being adjacent to the second positioning surface and configured for abutting an inner surface of the second sidewall of the workpiece;
- a guiding post disposed on the fixed member; the movable member defining a guiding hole to receive the guiding post; and
- a driving member;
- wherein the movable member is movably connected to the fixed member via the driving member; and the driving member is configured for moving the movable member in a direction away from the first claw portion of the fixed member; and
- wherein the second baseboard comprises a main body and a stepped portion, the stepped portion has a thickness less than a thickness of the main body, and the guiding hole is formed at the stepped portion of the second baseboard.

4. A manipulator, comprising:
a support arm;
a fixing mechanism mounted on the support arm, the fixing mechanism configured for fixing a workpiece comprising a bottom board, and a first sidewall and a second sidewall extending from a periphery of the bottom board and facing each other, the fixing mechanism comprising:
- a fixed member comprising a first baseboard and a first claw block extending perpendicularly from the first baseboard, the first claw block comprising a first positioning surface and a first claw portion, the first positioning surface being on an end of the first claw block away from the first baseboard and configured for abutting the bottom board of the workpiece, and the first claw portion being adjacent to the first positioning surface and configured for abutting the first sidewall of the workpiece;
- a movable member comprising a second baseboard and a second claw block extending perpendicularly from the second baseboard, the second claw block comprising a second positioning surface and a second claw portion, the second positioning surface being on an end of the second claw block away from the second baseboard and configured for abutting the bottom board of the workpiece, and the second claw portion being adjacent to the second positioning surface and configured for abutting the second sidewall of the workpiece; and
- a driving member;
- wherein the movable member is movably connected to the fixed member via the driving member; and the driving member is configured for moving the movable member in a direction away from the first claw portion of the fixed member;
- wherein the driving member comprises a threaded portion and a positioning portion adjacent to the threaded portion, the positioning portion of the driving member has no screw thread and has a diameter less than a diameter of the threaded portion, the fixed member defines a positioning hole to receive the positioning portion, and the positioning portion is rotatably received in the positioning hole;
- wherein the movable member defines a threaded hole, and the threaded portion engages in the threaded hole; and
- wherein the positioning hole comprises an inner sidewall, the inner sidewall defines a stepped portion thereon, the threaded portion of the driving member comprises a first end and a second end opposite to the first end, and the first end abuts the stepped portion.

5. The manipulator of claim 4, wherein the driving member further comprises a head at the second end and a latching groove at a distal end of the positioning portion far away from the threaded portion, and the latching groove is exposed from a bottom of the positioning hole, and is latched by a clip spring.

* * * * *